Aug. 9, 1960

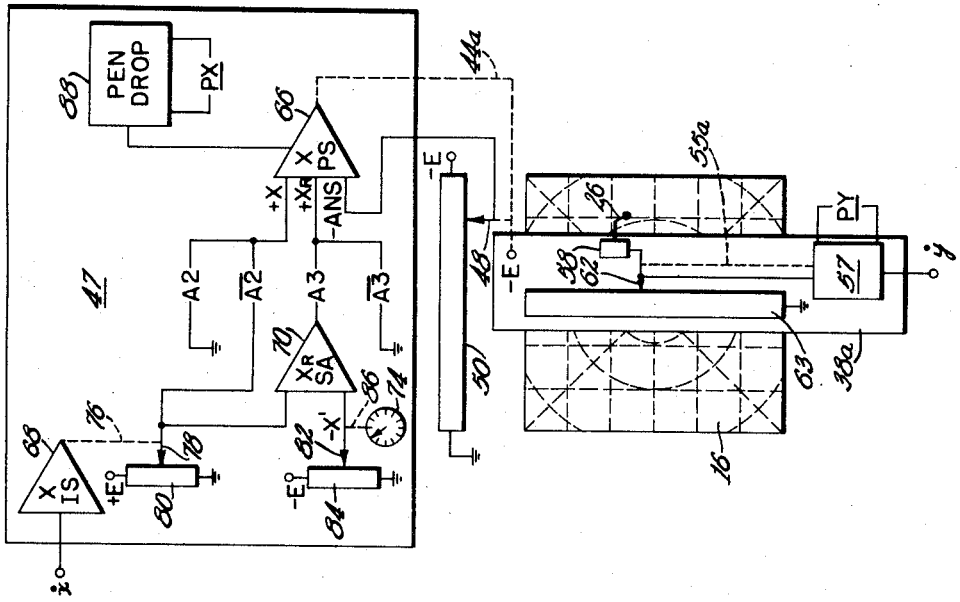

M. EISENSTARK 2,948,580

DUAL COURSE RECORDER

Filed Aug. 27, 1959

INVENTOR.
MILTON EISENSTARK

BY Norbert Ederer his ATTORNEY

United States Patent Office 2,948,580
Patented Aug. 9, 1960

2,948,580

DUAL COURSE RECORDER

Milton Eisenstark, Bronx, N.Y., assignor to Curtiss-Wright Corporation, a corporation of Delaware Filed Aug. 27, 1959, Ser. No. 836,387

6 Claims. (Cl. 346—8)

This invention relates to plotting equipment of the kind wherein a mathematical function or a course is plotted on a chart or map by means of a recording pen. More particularly the present invention relates to plotting equipment that includes means for changing the chart scale factor upon occasion to provide a detailed record on an expanded scale.

The present invention has application in the general field of function recording, for example in computing and recording the value of a dependent variable as a function of an independent variable. As another example, the present invention has application in the situation where it is desired to provide a time record of a variable condition, such as temperature, altitude, etc. Further the invention has particular utility in the recording of a path of an actual or simulated vehicle on a map. By way of example only, the invention will be described with reference to the charting of the flight path of an actual or simulated aircraft.

Recording apparatus of the general character contemplated by the present invention is known in the art, an example being U.S. Patent No. 2,529,468, granted to R. C. Dehmel on November 7, 1950. This patent discloses a rotatable chart supporting table, which is driven in one polar coordinate dimension, namely azimuth, while the cooperating pen is driven in the other variable, range. When a scale change is desired or required, the pen is lifted out of engagement with the map and is transferred to a location more distant from the chart origin and is then restored to engagement with the map. This arrangement advantageously utilizes one and the same charting surface, and the entire such charting surface for recording the plot both to the normal and the expanded scales. This is made practical by reason of the fact that the map legend is basically solely in the form of polar coordinate indicia reflecting the proximity of an air port, either to the normal or the expanded scale.

It is desirable to provide a record of the normal scale flight course on a chart that reflects the actual geographical location of the flight with reference to geographical land marks that appear on the map, for example cities or latitude and longitude, or both, as distinguished from merely range and azimuth or equivalent Cartesian coordinates with reference to an air field. At the same time the presentation of the expanded scale plot may be similar or may be in terms of coordinates with reference to the air field. To my knowledge, this has not been accomplished heretofore by plotting on one and the same recording surface, and the entire such recording surface, both the normal scale or course record and the expanded scale or approach record. Even if such an arrangement has in fact been known heretofore, an observer noting the progress of the flight on a continuous basis might be readily confused as to the particular map, course or approach, which the trace relates to, as both maps are visible simultaneously. A known prior approach to overcome this difficulty is presented in United States Patent No. 2,857,234. This discloses separate course and approach maps with associated individual recording pens, that activate the approach pen at the proper time as dictated by the progress of the flight.

It is desirable, and is a principal object of the present invention to provide a plotting apparatus wherein a single writing surface and a single associated recording pen assembly is provided for recording with respect to both the normal scale course map and expanded scale approach map, and that the map not instantly of interest be rendered substantially invisible to the viewer. This arrangement is obviously advantageous to the observer, as he need not shift his view upon transfer from course recording to approach recording and vice versa, nor is he apt to be confused by the simultaneous presentation of both maps.

It is another object of the invention to provide recording apparatus of the type mentioned in the preceding paragraph, in which the entire writing surface represents in the one case the full course map and in the other case the full approach map without any portions of either map being omitted.

It is a further object of the invention to render the two plots readily differentiable even though simultaneously visible, or the plot that is not instantly of interest substantially invisible together with its associated map.

The present invention contemplates provision of a semi-transparent plate which is sandwiched between the course map and the approach map. The approach map is in the form of a transparent plate with geographic indicia inscribed on the rear surface thereof, which rear surface is adjacent to the semi-transparent member. The front surface of the transparent plate serves as the common writing surface for recording the course and approach plots. A light source is provided to the rear of the course map and is switched on for the purpose of rendering the course map visible. It is turned off during approach map recording thereby rendering the course map invisible, and at the same time edge lights for the transparent plate are turned on to illuminate the approach map. These edge lights are switched off during course recording.

For a better understanding of the invention, reference is made to the following, more detailed specification, of which the appended claims form a part, when considered together with the accompanying drawings in which:

Fig. 1 is an exploded and partly fragmentary perspective view of recording apparatus in accordance with a preferred embodiment of the invention;

Fig. 3 is a schematic drawing of the circuitry for energizing the pen drive;

Figure 4:
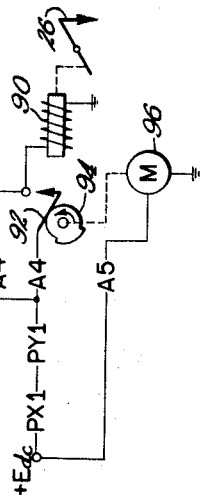
Fig. 4 is a schematic drawing of circuitry for dropping and lifting the pen to and from its writing position, as occasioned by transfer from course map to approach map recording and vice versa.

Referring to Fig. 1, the course map 10 is imprinted on translucent paper of the customary type. It is provided with the usual grid coordinate system, generally identified as by 12. The approach area is designated by the small square 14.

The apparatus includes four members of substantially conforming shape; these members are, proceeding from front to rear: a transparent board or plate 16, a semi-transparent board 18, the map 10 and a second transparent board 20. The approach map is inscribed on the rear surface of the front transparent board 16 in the form of the indicated polar system whose origin 22 may be the point of touch-down of an air field, for example. The inscription of the approach map on the rear surface of the transparent member 16 may be accomplished by way of etching, cutting of grooves, or painting.

Selector switch 24 is operable from the indicated "course" position, to the alternate "approach" position. In accordance with the invention it is arranged that when switch 24 is in the course position, the course map 10 is visible to the viewer while the approach map is substantially invisible; and vice versa in the case of selection of approach. Also, the tracing pen 26 (Fig. 2) traces the flight path in accordance with the location and at a speed as dictated by the course map scale and location requirements upon course selection, and in accordance with the approach map requirements upon selection of "approach." One and the same pen, namely 26, and one and the same writing surface, namely the front surface of transparent member 16 are utilized for recording both course and approach. The viewer, who may be the flight instructor, is under the optical illusion that in the one case the pen is tracing on the course map then solely visible to him, and in the other case on the approach map, then solely visible to him. In transferring from course to approach and vice versa, the pen 26 finds the same geographical location and continues to trace the flight path from the point just transferred to onward. This is accomplished in the following manner:

The four members 16, 18, 10 and 20 are illustrated as separated for convenience, but in actual practice are arranged in adjacent, contiguous layers. The member 20 serves principally to support the map 10 in upright position, while providing a light pervious medium through which light passes from a bank of incandescent or fluorescent line lamps generally designated as by 28. The light further passes through map 10 and the members 18 and 16, and thereby displays the map 10 to the viewer; this preponderates in visual effect over the approach map.

The switch 24 is connected to the supply voltage +E D.C.. In the indicated course position it serves necessarily to deenergize an approach relay A whose one end is grounded and whose other end is connected to the "approach" contact. It serves to energize the relay upon transfer to "approach." The relay coil is designated both in conventional manner and also by underlining of the letter A. The remaining relay coils used herein will be designated simply by reference letters underlined with the conventional illustration of the relay coil omitted. The "normally closed" (NC) contacts of the several relays used herein are designated by the reference letters identifying the associated relay coils with a bar thereabove and no bar below, while the "normally open" (NO) contacts are designated in similar manner but with no bar appearing above or below the reference letters. Additionally the normally open and closed contacts constituting one set for a given relay are differentiated from those constituting another set of the same relay by individual numbers following the reference letters. Thus for example, one set of such contacts of the relay A is illustrated in Fig. 1, designated as $\overline{A1}$ and A1. This simplifying convention for designating relays is similar to the conventions used in U.S. Patents 2,750,986 and 2,771,600. "Normalcy" as used herein refers to the state of the contacts were all sources of energization removed.

With switch 24 operated to select course, supply voltage +E D.C. is applied to the upper ends of the lamps 28 through the NC contact 1 of relay A, thereby lighting the lamps, in view of the grounding of their lower ends. With switch 24 placed in the approach position the relay is energized, the lamps 28 are extinguished, and instead another pair of similar lamps 30 are connected to the supply voltage through the NO contact 1 of the relay. The latter lamps light, in view of the grounding of their lower ends. The lamps 30 edge-light the transparent board 16 via respective "light pipes" 32. The members 32 are shaped approximately to rectangular form, but are filleted with a gentle curvature, and of a transparent material having a relatively low angle of internal reflection. Accordingly the light incident on the members 32 from respective lamps 30 is repeatedly reflected within the members 32 and in effect piped through these members. The light on emerging from the pipes 32 enters the transparent plate 16 at the lateral edges thereof, and passes through plate 16 in a generally planar path transverse to the front to rear direction of view. In passing through the plate 16, the light rays strike irregularities of the rear surface constituting the inscription of the approach map and are reflected frontally towards the viewer. The irregularities are illuminated and render the approach map visible. At the same time the course map is obscured by the semi-transparent member 18.

The plate 16 is preferably made of a transparent material having a relatively low critical angle of internal reflection, as is the case for the light pipes 32. Materials suitable for this purpose are acrylic, transparent plastics known by the trademarks Plexiglas or Lucite. These have a critical angle of internal reflection of approximately 42.8°. The light transmission through the plate is in part of the plane wave type, that is straight through the plate, and in part of the multiply reflected type, that is "bouncing" back and forth from the front and rear surfaces of the plate. If the approach map inscription is in the nature of grooving, the grooves are cut to an angle of 45° on either side of the normal, thereby permitting total reflection frontally. However grooving is not necessary, since the same reflective effect can be produced by an etched or painted type of inscription. These present sufficient irregularities to cause the desired internal reflection and display. Irrespective of the type of inscription selected, there will always be some light rays that emerge from the rear surface of the plate 16, but the course map 10 is not illuminated and remains obscured owing to the interposition of the semi-transparent board 18.

The optical properties of the semi-transparent plate 18 are well known; it is opaque and in fact essentially reflective when viewed from either side thereof so long as the light intensities on such sides are substantially equal. If however the light intensities are unequal, the plate is substantially transparent when viewed from the side exposed to the lower light intensity, but remains substantially opaque and reflective when viewed from the side exposed to the high light intensity. Suitable semi-transparent materials are transparent plates coated with a very thin metal deposit. Examples of suitable transparent materials are the aforementioned acrylic plastics, also transparent acetates or polyesters, e.g. such as are known as Mylar. Metals suitable for deposit are aluminum or silver. If the plate 18 is constructed of such metallized transparent material, the metallic coating is applied only to the front surface of the base transparent material, that is facing the viewer in the arrangement of Fig. 1. The advantage of selection of a metallized transparent material for plate 18 resides in the mirror reflective property of the plate. Thus any light rays emerging from the rear surface of the plate 16 are reflected. This fact may be taken advantage of to avoid parallax errors in viewing the display. There is however, a slight disadvantage in this scheme, for the viewer sees his mirror image displayed for the very reason of the excellent reflectivity of the plate 18 incident to selection of the approach map. Accordingly as an alternative, the material 18 may be made of a basically transparent material that is tinted light black or gray. In this case any light emergent from the rear surface of the plate 16 illuminates the plate 18, but the intensity is insufficient to render the map 10 visible. On the other hand the rear lights 28 are of much greater intensity so that they penetrate the map 10 and the plate 18 to an extent sufficient to render the map 10 visible. In order to avoid undesired illumination of the map 10 by the light 30 the latter are masked out in all but the desired front direction by means of opaque, U-shaped shields 34, which are coextensive with the lights 30 and the remaining described members, namely lamps 28, plates 10, 16 and 20, map 10 and light pipes 32.

It should be appreciated that the light pipes 32 are provided as a matter of convenience and could be eliminated provided the lights 30 were brought forward to alignment with the plate 16. Further, the elongated, line-type of lamp is not necessary for either lamps 30 or 28; the former could be replaced by a plurality of spaced point light sources disposed on either side of the plate 16. The lights 28 could be replaced by a single distributed light source emitting light frontally. The light color may be selected as white or in certain color schemes described hereinafter.

Figure 2:
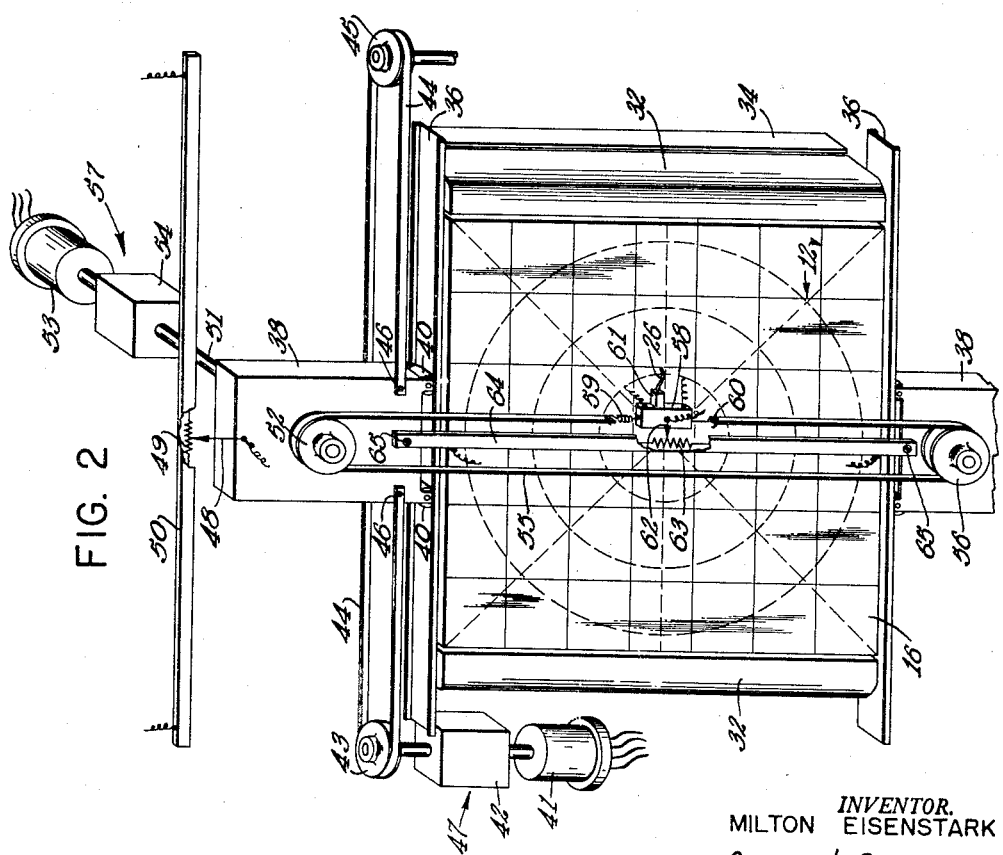
Fig. 2 is a perspective view of the apparatus of Fig. 1 and including additionally the recording pen and drive means therefor.

Fig. 2 illustrates the integration of the apparatus of Fig. 1 in a course recorder system. The illustrated course recorder is of the type known as "Variplotter" manufactured by Electronic Associates Inc., and is fully described in a brochure entitled "Variplotter Model 205N" published by the manufacturer. It is therefore illustrated in simplified fashion with most of the supporting frame structure omitted.

Referring to Fig. 2 the assembly of Fig. 1 is inserted intermediate of a pair of channel-like rails 36 which are disposed adjacent the upper and lower ends of the assembly and extend in horizontal, transverse direction. The channels serve as tracks for a pair of vertically oppositely disposed carriages 38, each of which is provided with a pair of track engaging rollers 40 which permit motion of the carriages in the horizontal direction. Such motion is imparted by means of a horizontal or east-west drive motor 41 through the intervening agency of a gear reduction box 42 and drive pulley 43, all arranged to rotate in the horizontal plane about a vertical axis. A horizontally extending drive tape 44 engages the pulley 43 above and to the left end of the track 36 and engages a similarly aligned idler pulley 46 located above and to the right end of channel 36. The tape 44 is not endless, but rather has its ends secured to the carriage 38 by means of screws 46. The members 41 through 45 constitute part of an X or east-west drive system 47 including electrical control signal generation for the motor 41 described hereinafter. A slider 48 is secured towards the upper end of the carriage 38 and engages a slide wire potentiometer indicated diagrammatically as at 49 that is substantially co-extensive with the width of the maps. The potentiometer is provided with a dust cover 50 which is of somewhat greater length than the potentiometer proper. Outgoing wires are provided at motor 41, the ends of potentiometer 49 and slider 48.

A shaft 51 extends through an opening (not visible) of carriage 38 in the front to rear direction and is rigidly coupled to a drive pulley 52 located frontally of the upper carriage 38. Rotary motion in the vertical plane is transmitted from a motor 53 via a similar gear reducer 54 and shaft 51 to the pulley 52. A vertically extending second tape 55 engages the pulley 52 and also engages an oppositely located idler pulley 56 that is mounted for rotation on the lower carriage 38. The members 51 through 56 form part of a north-south or Y drive system 57 including electrical control signal generation for motor 53 described hereinafter. The tape 54 is likewise not endless but supports a pen solenoid housing block 58 by means of a tension spring 59 and a hook and eye arrangement 60 provided at the upper and lower ends of the housing 58 respectively. The spring is provided for purposes of shock absorption to protect the pen 26 which extends from a supporting block 61 secured to the side of the housing 58. A slider 62 engages a similar potentiometer 63 that is co-extensive with the map assembly in the vertical direction and is provided with a similar dust cover 64 which is secured at its ends to the carriages 38 by means of screws 65. Connecting wires are brought out from the motor 53, the ends of the potentiometer 63, slider 62, and also the solenoid block 58.

The course recording system operates in well known manner; the motor 41 imparts motion in the east-west direction to the carriages 38 and therefore ultimately to the pen 26, while the motor 53 imparts vertical motion ultimately to the pen through the intervening drive means. The pen 26 engages the front surface of the plate 16 and traces out a path in accordance with input signals applied to the motors 41 and 53. The electrical system effective to control the motors and ultimately the pen 26 to chart the flight path in accordance with either the course map or approach map requirements is illustrated in Fig. 3 to which reference is now made.

The apparatus illustrated in Fig. 3 employs alternating voltage type analog computing circuitry. The east-west unit 47 includes a position servo system 66, an integrating servo system 68 and a summing amplifier 70. The functioning of these components is explained in detail in Patent 2,798,308 for example. Briefly summarized, the summing amplifier 70 delivers an output signal that represents the algebraic summation of the input signals applied thereto through respective summing resistors.

For simplicity of the disclosure, the summing amplifier is designated by SA enclosed, together with the variable $x_r$ that the summing amplifier computes, in a triangle, and the input resistors may be assumed to be contained within the summing amplifier proper.

The position servo 66 includes a summing amplifier that energizes a control winding of a two-phase induction motor, namely motor 41. The motor is provided with a second phase winding which is energized by a constant reference voltage, that is 90° out of phase with a reference voltage $+E$ encountered hereinafter. The signal voltages which actuate the summing amplifiers and servo amplifiers are either in phase with or in phase opposition to the reference voltage $+E$, as reflected by plus or minus signs respectively. There is also employed a further reference voltage $-E$, which is of like magnitude as, but opposite phase to the reference voltage $+E$. The servo motor is bi-directional, the direction of rotation depending upon the net phase of the external input signal applied to the servo amplifier. The velocity of rotation is in accordance with the magnitude of the net external input signal. The servo motor drives a generator that provides a further input signal to the servo summing amplifier for velocity feedback purposes. The servo motor further drives through the mechanical connections 44a, which are intended to represent the drive means 42 to 45 collectively, the carriage assembly 38a which is intended to represent the carriages 38 and the members supported thereby, including the slider 48 of potentiometer 50. The potentiometer is grounded at its left end and connected to the voltage $-E$ at its right end. The slider 48 connects to the input of the amplifier 66 and serves as an answer signal.

The servo motor is actuated in response to non-zero net input signal and comes to a rest when the answer signal rebalances the net external signal.

In the interest of clarity the servo system is designated by PS, enclosed with the variable $x$ that the servo motor shaft position represents, in a triangle. It is intended that this include the servo summing amplifier with its input resistors, the servo motor and velocity feedback generator.

The integrating servo 68 is internally substantially of the same construction as the position servo 66, but is not provided with an answer input. Its motor runs for so long as the net external input signal, herein designated as $\dot{x}$ is non-zero, and comes to a rest when such input signal reaches zero. For convenience the system is designated by IS, enclosed with the particular variable that the servo motor shaft position represents in a triangle. It is intended to include the same units as are included in the position servo 66.

At the beginning of the training exercise the instructor will position the pen 26 manually to the point of departure of the fictitious flight, by actuation of the tapes 44 and 55. He will also set in the X and Y coordinates of the lower left hand corner 72 (Fig. 1) of the approach square 14, reckoned with reference to the origin of the course map 10. He accomplishes this by operation of a graduated dial 74 contained within the east-west system 47 and a similar calibrated dial associated with the block 57 that represents the north-south system supported on carriage 38a. The system 57 is structurally and functionally similar to the system 47 and is therefore not described in detail. It may be assumed hereinafter that for every component and event described with reference to the X system 47 there exist a corresponding component and event in the Y system 57. The instructor may alternatively set in the coordinates of point 72 during the course of the training exercise.

As the training exercise proceeds, a flight computer, for example that illustrated in Patent No. 2,529,468 will deliver the input voltage $\dot{x}$ to the integrating servo 68 and the voltage $\dot{y}$ to a corresponding integrating servo contained within units 57. These voltages represent respectively east-west and north-south ground speed of the simulated flight. The selector switch 24 will be in the course position, and the pen 26 will trace a flight path on what appears to the instructor to be the course map 10, but is actually the front surface of the transparent plate 16. This is accomplished in the following manner.

In response to the east-west ground speed input signal $\dot{x}$, the integrating servo 68 operates through mechanical connections designated by 76 the slider 78 of a linear (uniform contour) potentiometer 80 that is grounded at its lower end and connected to the reference voltage $+E$ at its upper end. The potentiometers used herein are all linear. Accordingly the slider 78 derives a signal that is proportional to the $x$ position of the flight. This signal is applied through the NC contact 2 of the approach relay as input signal $+x$ to the position servo 66. The servo drives the carriage assembly 38a to a position corresponding to the computed east-west value, and also drives the slider 48 of the potentiometer 50 to a corresponding position. The slider 48 provides an answer signal of negative phase ($-$ANS) to the servo, rebalancing signal $+x$ on a continuous basis. In similar manner the Y position servo will drive the solenoid box 58 and pen 26, and further the slider 62 of the north-south answer potentiometer 63, in response to the north-south ground speed input signal $\dot{y}$. The pen 26 will trace the flight path. It is to be observed that the $y$ answer potentiometer 63 is grounded at its lower end and connected to the reference voltage $-E$ at its upper end. The grounded ends of the potentiometers 50 and 63 represent the axes of ordinates and abscissae of the course map 10 respectively. The upper ends of the potentiometers represent the upper and right edges of the course map. Similarly the lower end of potentiometer 80 represents the axis of ordinates and its upper end the right edge of the course map 10. A potentiometer similar to 80 and contained in unit 57 will define at its extremities the axis of abscissae and the upper edge of the chart 10.

The servo system is provided with a second input $+x_R$ that is presently grounded through the NC contact 3 of the approach relay A. The voltage derived from slider 78 is further applied as input to the summing amplifier 70, which receives a further input signal $-x'$ from the slider 82 of a potentiometer 84 that is grounded at its lower end and is energized by the reference voltage $-E$ at its upper end. The slider 82 is positioned by operation of the dial 74 through the mechanical connections 86. The voltage $-x'$ derived from slider 82 therefore represents the $x$ coordinate of the point 72, and since it is inherently of opposite phase to that derived from slider 78 the output signal of the amplifier 70 $x_R$ will represent the instant $x$ coordinate of the flight position relative to the translated origin 72. In similar manner the $y$ system will generate a relative $y$ coordinate $y_R$. Let it be assumed that the flight will enter the approach area 14 at the coordinate 72. At the instant of entry the $x_R$ and corresponding $y_R$ voltages will both be zero. The instructor noting the entry, will operate the selector switch 24 to the approach position, thereby displaying the approach map and obscuring the course map 10 as previously described. At the same time the input $+x$ will be grounded through the NO contact 2 of the now energized approach relay, while the input $+x_R$ connects through the NO contact 3 of the relay to the output of the amplifier 70. Similar effects will take place in the $y$ unit 57. As a result the input signal to the $x$ position servo 66 and the corresponding $y$ position servo will both be zero, dictating that the pen travel to the lower left hand corner of the plate 16. This will in fact happen. The flight path will be traced on what appears to be the approach map. In order that this be done in accordance with the scale of the approach map, it is necessary that the gain from the slider 78 to the output of servo 66 via amplifier 70 be greater than the gain between the same two points through contact $\overline{A2}$ by a factor equal to the ratio of the scales of the two maps. This is readily accomplished by proper gain selection for amplifier 70 or by selection of the appropriate input resistors for the inputs $+x$ and $+x_R$ or a combination thereof. The same will hold true for the $y$ unit 57. Accordingly the flight path will be traced out on the "approach map" to its correct scale. It is readily seen that the transfer from course to approach map will occur in the correctly required location with any other point of entry to the approach area 14.

While the flight path is traced out on the approach map, the slider 78 and the corresponding slider in unit 57 continue to "remember" the location of the flight with reference to the course map. Accordingly when the pen 26 reaches an edge of the plate 16, or sooner if he so desires, the instructor will retransfer switch 24 to the course position and the position servos in the units 47 and 57 will transfer pen 26 to the location as dictated by the requirements of the course map 10. At the same time the course map will become visible again and the approach map substantially invisible.

It is desirable that in transferring from course to approach recording and vice versa, the pen 26 be lifted from engagement of the writing surface in order to avoid a pen trace that has no meaning with reference to the flight location. To this end there is provided a pen drop control circuit 88 within unit 47 that normally maintains a relay PX energized, but deenergizes the same upon transfer from one map to the other. Under normal conditions of plotting on one map or the other, the servo 66 will produce a small residual error signal that is sufficient to continue operation of the servo motor so as to minimize such error signal. Upon change of scale however, the error signal experiences a large increase in magnitude, dictating transfer from point 72 to the lower left hand corner of the writing surface, for example.

This fact is taken advantage of to deenergize the relay PX. The pen drop control circuit 88 receives an error input signal from a stage of the servo amplifier within unit 66. This signal is of too small a magnitude to deenergize the relay under normal conditions, but becomes sufficiently large to produce this effect upon operation of switch 24 in either direction to effect transfer. The relay PX continues its state of deenergization while the pen 26 homes in on its newly required position. The internal circuitry of the unit 88 is well known; it may comprise for example a rectifier that rectifies the negative peaks of the incoming voltage. The rectified voltage is applied to the grid of a normally conducting tube whose plate circuit includes the relay coil PX. Under normal conditions the negative grid bias is insufficient to cut the tube off so that the relay remains energized, and conversely under conditions of map change. A similar pen drop unit is provided within unit 57 and serves to energize and deenergize a corresponding PY relay.

Referring to Fig. 4 the pen 26 is normally maintained in the writing-surface-engaging, dropped position by the normally energized pen solenoid 90 contained within housing 58. For a description of the physical construction of the pen and its associated inkwell and the solenoid, reference is made to the Variplotter brochure previously mentioned. The fact of energization of the solenoid to drop and of deenergization to lift is preferred to the converse, as this results in protection of the pen when power to the recorder is turned off.

The solenoid is energized over the series circuit extending from the source +E D.C. through the NO contacts 1 of the PX and PY relays and the NC contact 4 of the approach relay through the solenoid to ground, in the case of course recording. In order to differentiate the approach trace from the course trace, the pen 26 is caused alternately to be dropped and lifted on approach recording. In this case the energization circuit instead of passing through the NC contact 4 of relay A passes through the NO contact 4 and then through a switch 92 driven by a cam 94 to the solenoid coil. The cam 94 is driven by a motor 96 that is energized from the source +E D.C. through the NO contact 5 of the relay A. The cam 94 alternately opens and closes switch 92 thereby alternately interrupting completing the energization circuit for the solenoid. As a result the pen 26 traces a dashed line path. It is to be noted that deenergization of either the PX or PY relay is sufficient to lift the pen irrespective of course or approach selection, so that as desired, the pen 26 is lifted while homing during map transfer.

Figure 5:
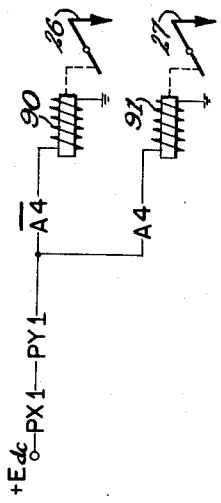
Fig. 5 illustrates a modification of the circuitry of Fig. 4 which is utilized for recording separate pens on the course and approach maps respectively.

Fig. 5 illustrates an alternative to the arrangement of Fig. 4. Here the operation is the same for course recording. However a second solenoid 91 is connected to the NO contact 4 of relay A and ground. It is effective to drop and lift a second pen 27 according to whether approach or course is selected, concurrently with the lifting and dropping of pen 26. In this arrangement the pens are supplied with ink of different colors for the purpose of differentiation of the approach and course plots. The pens 26 and 27 are arranged to engage the writing surface at the same point were they simultaneously dropped, which of course they are not. The physical configuration of the dual pens is also described in the Variplatter brochure. In the modification employing dual pens in accordance with Fig. 5, advantageously the pens 26 and 27 may be provided with ink of complementary colors, say yellow for the course pen 26 and green for the approach pen 27. Correspondingly the lamps 28 are arranged to illuminate the members frontally thereof with green light, whereas the edge lights 30 are arranged to provide yellow light, and further the coordinate pattern on the rear surface of the plate 16 is painted in green color. This scheme requires that the map 10 be made of one or more colors rendering it visible when illuminated by green light, as for example white or yellow. With this arrangement, when course is selected the green light emitted from the lamps 28 illuminates the map 10 and also the flight path traced out by pen 26, these being of the complementary color yellow, but obscures the approach map indicia and the approach plot, which are of the same color, namely green. The converse is true in the case of approach selection.

The just described modification provides opportunity for separately visible photographs to be taken after the complete course and approach recordings have been made, by the use of panchromatic film. As a further variant, the approach map coordinates need not be painted, but may be etched or grooved, as previously described.

Thus it will be seen that in accordance with the present invention I have provided a dual course recording system, which is of particular convenience in use, is particularly simple to construct and admits of ready incorporation in existing recording systems. The manual operation of the selector switch 24 to effect transfer from course to approach recording and vice versa is entirely satisfactory, as the recording speed generally encountered is relatively low. Automatic transfer forms the subject matter of a separate invention which is disclosed and claimed in a copending application of Ralph L. Samson, Serial No. 836,527, filed August 27, 1959, and assigned to the assignee of the present invention.

While there has been described the basic concept of the invention and several modifications thereof, it should be understood that further modifications may occur to those skilled in the art, and it is intended that all such modifications be comprehended within the invention as defined by the spirit and scope of the appended claims.

What is claimed is:

1. In a plotting system for recording a plot alternatively to normal and expanded predetermined scales: mutually cooperating writing means and recording surface means, the latter including a light-transmissive member, a semi-transparent and a transparent plate-like member arranged one adjacent to the next in the order named proceeding to said writing means, said transparent and light transmissive members bearing indicia in accordance with one and the other of said two scales respectively, said transparent member serving as common recording surface for plotting according to both said scales; lighting means adapted upon energization to transmit light through said members in the order named; means adapted upon energization to edge-light said transparent member; drive means for imparting relative motion as between said two mutually cooperating means to produce a plotted trace on said transparent member; and switching means operable to switch said drive means and said two light means to alternative conditions, said conditions being operation of said drive means in accordance with the scale of said transparent member and simultaneous energization of said edge-light means on one hand, and operation of said drive means in accordance with the other scale and simultaneous energization of the other light means on the other hand, whereby a viewer may observe the indicia corresponding to the two scale plots separately.

2. Apparatus according to claim 1, wherein the writing means comprises a pair of recording pens responsive to operation of the switching means alternatively to engage and disengage the aforesaid recording surface to trace thereon plots in different colors corresponding to the two scale selections, to afford discrimination between such plots.

3. Apparatus according to claim 2, wherein the two recording pens upon respective energization trace plots in complementary colors, wherein the two light means emit light of the same two complementary colors, but in inverse order of energization, and wherein the two sets of indicia are provided in colors matching those of their respective traces, whereby substantially solely one set of indicia and the thereto corresponding trace are visible at a time.

4. A system according to claim 1 wherein the semitransparent member is composed of a transparent material having a thin metal deposit on its front surface.

5. A system according to claim 1 wherein the semitransparent member is composed of tinted transparent material.

6. A system according to claim 1 wherein the transparent member is made of an acrylic plastic having a relatively low angle of internal reflection.

References Cited in the file of this patent

UNITED STATES PATENTS

| | | |
|---|---|---|
| 1,930,359 | Hilgenberg | Oct. 10, 1933 |
| 2,714,047 | Dehmel | July 26, 1955 |
| 2,857,234 | Murray | Oct. 21, 1958 |

FOREIGN PATENTS

| | | |
|---|---|---|
| 1,047,713 | France | Dec. 16, 1953 |